United States Patent [19]

Katoh et al.

[11] Patent Number: 4,608,956
[45] Date of Patent: Sep. 2, 1986

[54] OPERATING APPARATUS FOR LEAN BURN INTERNAL COMBUSTION ENGINE

[75] Inventors: Kenji Katoh, Susono; Toshio Yamada, Mishima; Kenichiro Shindo; Souichi Matsushita, both of Susono; Tokuta Inoue, Mishima, all of Japan

[73] Assignee: Toyota Jidosha Kabushiki Kaisha, Japan

[21] Appl. No.: 671,013

[22] Filed: Nov. 13, 1984

Related U.S. Application Data

[63] Continuation of Ser. No. 502,640, Jun. 9, 1983, abandoned.

[30] Foreign Application Priority Data

Aug. 17, 1982 [JP] Japan ................................. 57-141715

[51] Int. Cl.[4] .............................................. F02P 5/14
[52] U.S. Cl. .................................... 123/417; 123/489; 123/480; 123/422
[58] Field of Search ............... 123/417, 418, 416, 480, 123/489, 478, 422; 364/431.05

[56] References Cited

U.S. PATENT DOCUMENTS

| | | |
|---|---|---|
| 4,231,733 | 11/1980 | Hickam et al. . |
| 4,264,425 | 4/1981 | Kimura et al. . |
| 4,389,994 | 6/1983 | Denz et al. ........................... 123/417 |
| 4,391,253 | 7/1983 | Ito ......................................... 123/417 |
| 4,403,584 | 9/1983 | Suzuki et al. ........................ 123/417 |
| 4,425,890 | 1/1984 | Yamaguchi ........................... 123/422 |
| 4,442,812 | 4/1984 | Mizuno et al. ....................... 123/480 |
| 4,481,908 | 11/1984 | Iida ....................................... 123/489 |
| 4,508,075 | 4/1985 | Takao et al. ......................... 123/489 |

FOREIGN PATENT DOCUMENTS 0128661 10/1980 Japan ................................. 123/417

Primary Examiner—Parshotam S. Lall
Attorney, Agent, or Firm—Parkhurst & Oliff

[57] ABSTRACT

An internal combustion engine of a lean burn type, wherein the air-fuel ratio is feedback controlled to a predetermined fixed value which is higher than a theoretical air-fuel ratio. The ignition timing is changed when the air-fuel ratio as detected by a lean sensor is off from the target air-fuel ratio, enabling quick control of the engine when the air-fuel ratio is off from the target air fuel ratio.

6 Claims, 7 Drawing Figures

OPERATING APPARATUS FOR LEAN BURN INTERNAL COMBUSTION ENGINE

This is a continuation of application Ser. No. 502,640 filed June 9, 1983, now abandoned.

BACKGROUND OF THE INVENTION

1. Field of the Invention

The present invention relates to an engine operating apparatus for an internal combustion engine supplied with a very lean air-fuel mixture near the misfire limit.

2. Description of the Prior Art

It is known in the prior art that a high combustion efficiency and fuel consumption efficiency are obtained with a lean air-fuel mixture of a ratio higher than the theoretical air-fuel ratio, i.e., higher than about 14.5. It is also known that the emission of nitrogen oxides from the engine may be reduced in the lean air-fuel mixture region.

An engine supplied with such a lean air-fuel mixture, however, must have an ignition timing highly responsive to changes in the air-fuel ratio. For example, if the air-fuel ratio changes 1.0, the ignition timing must be changed 3 to 6 degrees. This means that both the air-fuel ratio and ignition timing must be precisely controlled.

In a heretofore-provided lean burn internal combustion engine, air-fuel ratio is maintained by arranging a so-called "lean sensor" in the flow of the exhaust gas to detect the concentration of an exhaust gas component; using signals from the sensor to determine the air-fuel ratio during engine operation; and feed-back controlling the amount of fuel to be injected.

This type of engine control apparatus, however, suffers from the drawback of a large time lag in control due to the delayed transmission of fuel from the fuel injection valves and the attachment of liquid fuel onto the inner surface of the intake pipe. The relationship between the air-fuel ratio and ignition timing is that determined under the engine operating conditions, e.g., combination of the engine rotational speed and the intake air pressure, of that particular moment. Therefore, if the air-fuel ratio is off from the target value, the engine will operate under an ignition timing off from the required value, i.e., an advanced or delayed timing, resulting in poorer drivability, increased emission, and decreased fuel consumption efficiency.

SUMMARY OF THE INVENTION

An object of the present invention is to provide an engine operating apparatus, capable of maintaining an optimum relationship between the air-fuel ratio and the ignition timing even if the air-fuel ratio is changed from a predetermined target value.

In accordance with the present invention, there is provided engine operating apparatus for an internal combustion engine supplied with a lean air-fuel mixture. The apparatus comprises a means for detecting the actual air-fuel ratio and issuing signals indicating the detected air-fuel ratio; a means for detecting the engine operating parameters, and issuing signals indicating the detected engine operating parameters; a first calculating means for calculating the air-fuel ratio using the signals from the operating parameter detecting means; a second calculating means for calculating a basic ignition timing using signals from the operating parameter detecting means; a third calculating means for calculating the difference between the air-fuel ratio calculated by the first calculating means and the air-fuel ratio actually detected by the air-fuel ratio detecting means so as to obtain ignition timing correction values; and a means for ignition of the engine at an ignition timing determined by the sum of the basic ignition timing and the correction value.

BRIEF DESCRIPTION OF THE DRAWINGS

Other objects as well as advantages of the present invention will be clear from the following description of an embodiment together with the attached drawings, in which.

DESCRIPTION OF THE PREFERRED EMBODIMENTS

Figure 1:
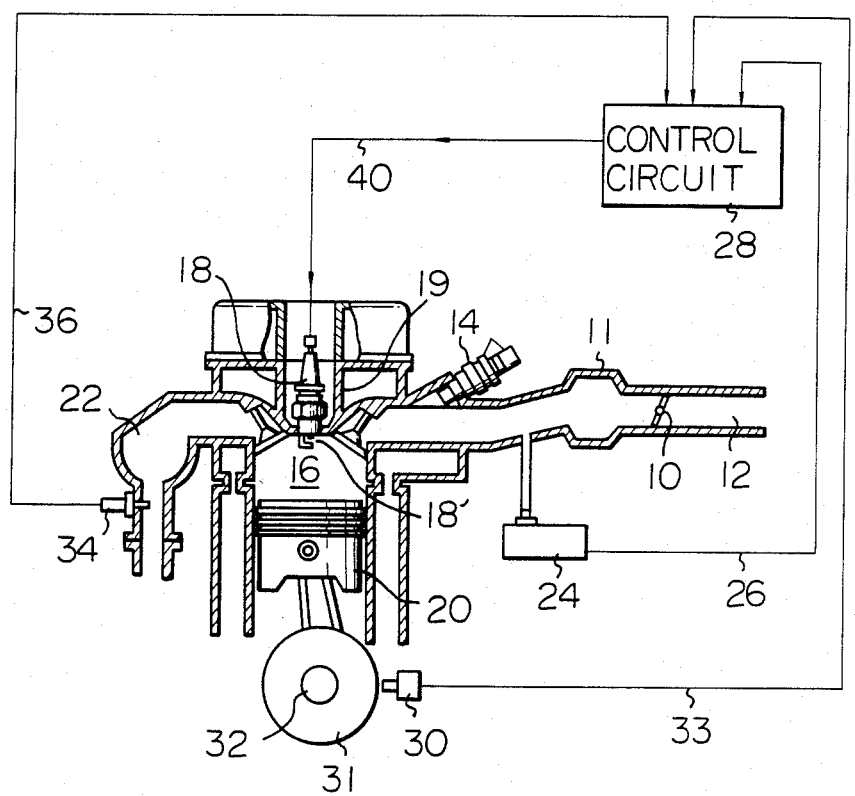
FIG. 1 is a schematic view of an internal combustion engine according to the present invention.

The present invention is now described with reference to the attached drawings. In FIG. 1, which schematically indicates an internal combustion engine of an electrical fuel injection type, reference numeral 10 denotes a throttle valve. A surge tank 11 is arranged downstream of the throttle valve 10. Intake air from the surge tank 12 is introduced together with fuel from a fuel injection valve 14 into a combustion chamber 16. A spark plug 18 is mounted at a cylinder head 19, which has a spark gap 18' located in the combustion chamber 16. The spark gap 18' produces a spark at a predetermined crank angle position of a piston 20 in order to cause ignition. Combustion gas thus generated is exhausted from the combustion chamber 16 to an exhaust manifold 22.

A pressure sensor 24 is connected to an intake manifold 12 in order to detect pressure in the intake line of the engine. The pressure sensor 24 is connected to a control circuit 28, which is of a programmed computer type, via a line 26 and issues signals thereto.

A crank angle sensor 30 is arranged adjacent to a toothed member 31 rigidly connected to a crankshaft 32 of the engine. The crank angle sensor 30 is connected to the control circuit 28 via a line 33. An air-fuel ratio sensor 34 of a so-called lean sensor type is connected to the exhaust manifold 22 for detecting an air-fuel ratio larger than the theoretical ratio of about 14.5. The air-fuel ratio sensor 34 is connected to the control circuit 28 via a line 36.

The control circuit 28 operates, in response the signals from the sensors 24, 30, and 34, to issue an operating signal directed to the the spark plug 18 via a line 40, to cause ignition at a calculated crank angle. The control circuit 28 also provides signals for operating the fuel injection valve 14 and other elements (not shown) for controlling various engine operations. These latter elements are not directly related to this invention and are therefore, not explained.

Figure 2:
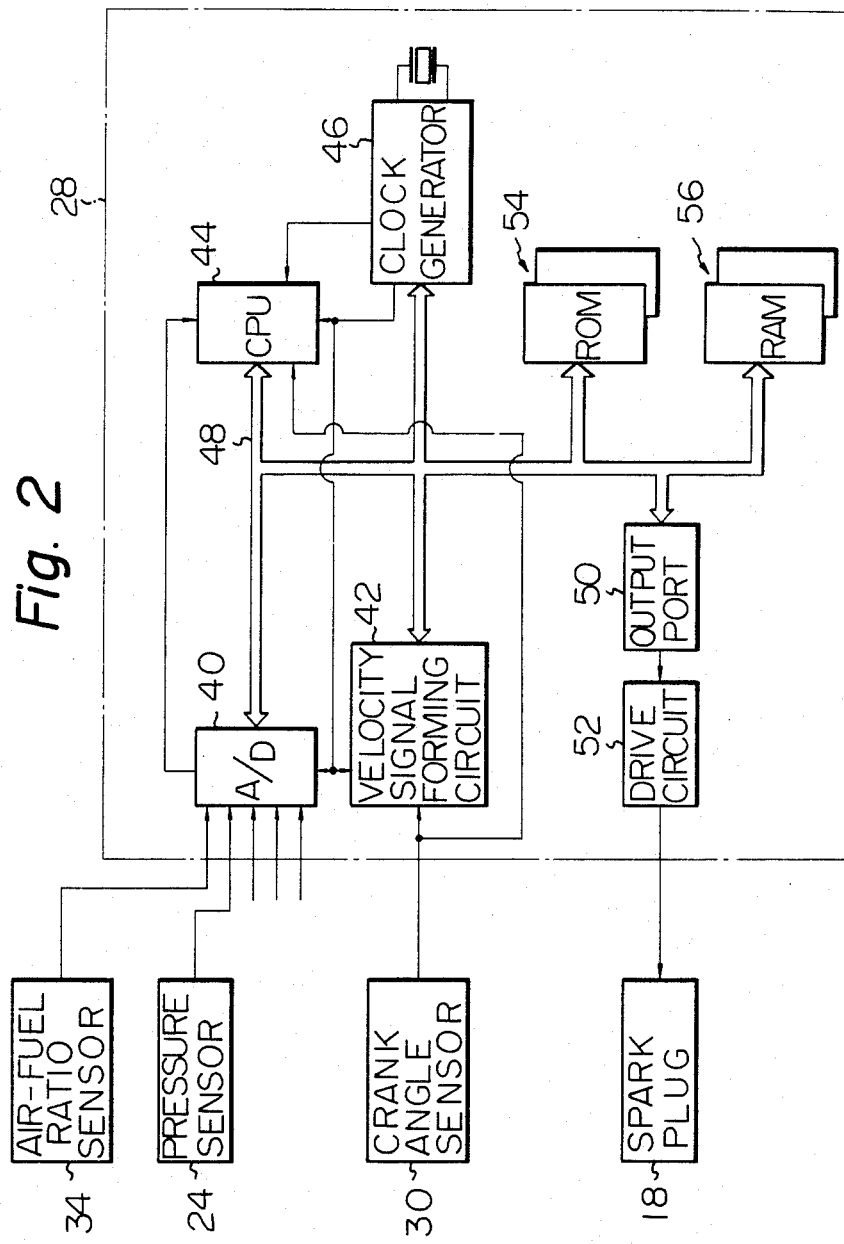
FIG. 2 is a block diagram indicating a control circuit in FIG. 1.

In FIG. 2, showing a block diagram of the control circuit 28, signals from the pressure sensor 24 and air-fuel ratio sensor 34 are supplied together with signals from other not shown sensors to an analog-to-digital (A/D) converter 40 incorporated therein an analog multiplexer. At the A/D converter 40, analog signals from the sensors are converted to digital signals at a predetermined sequence.

The crank angle signal issued from the crank angle sensor 30 at every predetermined crank angle is introduced into a velocity signal forming circuit 42 and to a central processing unit (CPU) 44 as an interrupt signal synchronized with the crank angle. The velocity signal forming circuit 42 is provided with a gate operated by the signal from the crank angle sensor 30 and with a counter to count the number of clock pulses passing the gate and issued from a clock generator 46, so as to generate a digital signal indicating the engine rotational speed. In place of the velocity signal forming circuit 42, softwear for producing a velocity signal may be provided.

The CPU 44 issues via a bus 48 an ignition signal to an output port 50 at a crank angle calculated as hereinafter described. A drive circuit 52 then provides a signal directed to spark plug 18.

The A/D converter 40, the velocity signal forming circuit 42, and the output port 50 are connected via the bus 48 to the CPU 44, a read only memory (ROM) 54, a random access memory (RAM) 56, and the clock generator 46, which are the components of the microcomputer system. The bus 48 operates to transmit input or output data.

Figure 3:
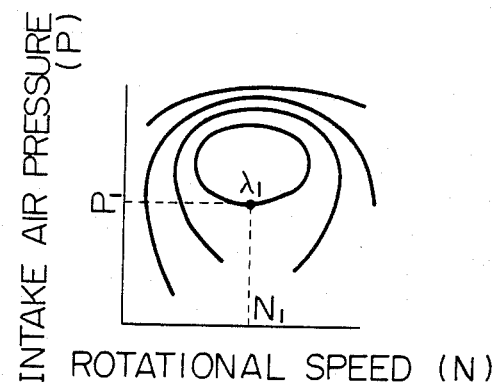
FIG. 3 is a map of the air-fuel ratio with respect to combinations of rotational speed and intake air pressure.
Figure 4:
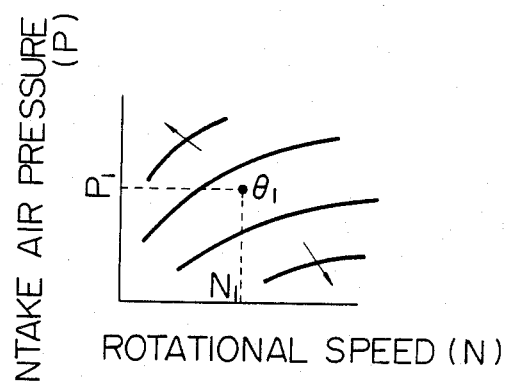
FIG. 4 is a map of ignition timing.

The ignition timing control of the present invention using the microcomputer system will now be described. Such control is formed as softwear realized as a program memorized in the ROM 54. Prior to describing the routine effected by the program, the basic idea of the ignition timing control according to the present invention is outlined. FIG. 3 shows a contour map of the air-fuel ratio with respect to the engine rotational speed N and intake air pressure P, which represents the engine load. FIG. 4 shows a contour map of the ignition timing with respect the variables N and P. During engine operation, the combination of the rotational speed $N_1$ and intake air pressure $P_1$ is detected. Then an air-fuel ratio $\lambda_1$ and an ignition timing $\theta_1$, corresponding to the detected combination of the rotational speed $N_1$ and intake pressure $P_1$, is calculated.

In the prior art, when there was a difference between the target air-fuel ratio and actual air-fuel ratio detected by the air-fuel ratio sensor, feedback control was effected, by changing the amount of the fuel injection in accordance with the difference, to bring the actual air-fuel ratio in conformity with the target air-fuel ratio. According to the present invention, unlike the prior art, feedback control is effected by changing the ignition timing in accordance with the difference between the air-fuel ratio $\lambda_2$ and target air-fuel ratio $\lambda_1$.

Figure 5:
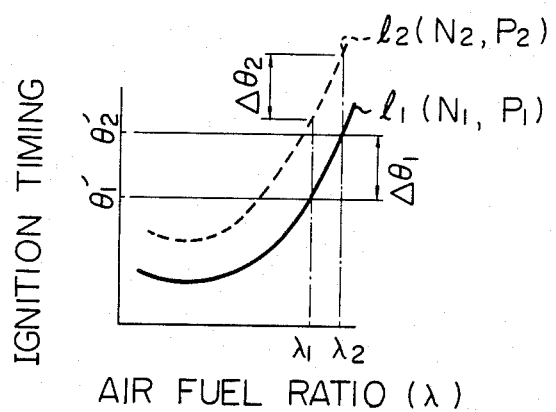
FIG. 5 shows relationships between the air-fuel ratio and ignition timing at a predetermined fixed combination of rotational speed and intake air pressure.

Referring to FIG. 5, illustrating this principle of the present invention, line $l_1$ shows the relationship between the air-fuel ratio and the ignition timing when the engine is operating under a fixed condition determined by a single combination of the rotational speed $N_1$ and intake pressure $P_1$. When the operating condition is changed ($N_2$, $P_2$), the relationship between the air-fuel ratio and the ignition timing would be shown by a modified line $l_2$.

Various relationships between the air-fuel ratio, the ignition timing, and operating conditions may be stored in a memory map. When the air-fuel ratio is changed from $\lambda_1$ to $\lambda_2$, the necessary change of the ignition timing, $\Delta\theta_1$ and $\Delta\theta_2$, may be calculated from the map. However, in the shown embodiment of the present invention, control of the ignition timing is effected without a memory map provided with a plurality of relationships between $\lambda$ and $\theta$. This embodiment is based on the fact that, in relationships $l_1$ and $l_2$ in FIG. 5 with respect to different operating conditions, the changes $\Delta\theta_1$ and $\Delta\theta_2$ of the ignition timings when the air-fuel ratio is changed are substantially the same even if the operating conditions are changed from $l_1$ to $l_2$. This means that a single curve, such as curve $l_1$, may be used for all operating conditions. The absolute value of the ignition timing, when the air fuel ratio is changed, for example, from $\lambda_1$ to $\lambda_2$, changes in accordance with the engine operating conditions. However, the change of the ignition timing $\theta_1$ under one set of operating conditions, corresponding to a combination of the rotational speed $N_1$ and the pressure $P_1$, and the change of the ignition timing $\theta_2$ under another set of operating conditions, corresponding to combination of the rotational speed $N_2$ and the intake pressure $P_2$, are substantially the same. This means that by storing in a memory a single relationship $l_1$ between the air-fuel ratio and the ignition timing under a single set of operating conditions ($N_1$ and $P_1$) changes of the ignition timing may be calculated even if the operating conditions are changed. The change in the ignition timing is added to the ignition timing calculated from N and P to cause ignition. Thus, the engine is operated under an ignition timing matched with the changed operating conditions. As a result, the drivability, emission, and fuel consumption efficiency are improved even if the actual air-fuel ratio is different from the target air fuel ratio.

Figure 6:
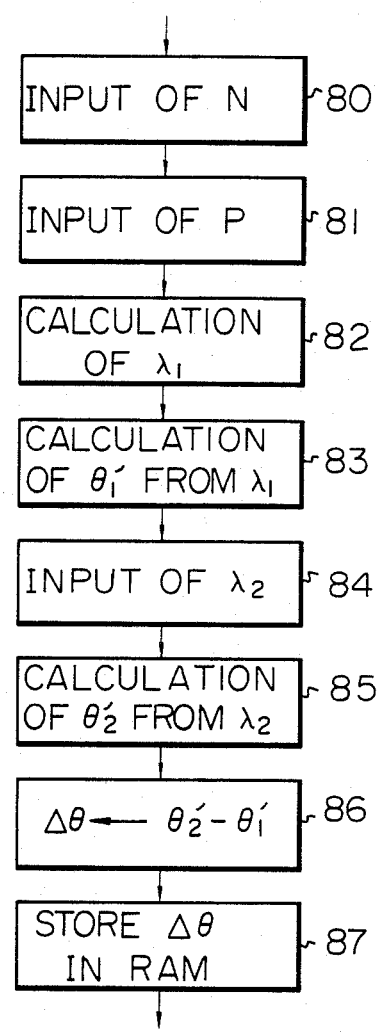
FIGS. 6 and 7 are flow charts of routines effected at the programmed microcomputer system.

Now, a construction of the present invention for realizing the above-mentioned basic idea will be described with reference to the flow charts shown in FIGS. 6 and 7. FIG. 6 shows a section of a main routine for calculating the correction value of the ignition timing. At point 80 of the flow chart, the CPU 44 reads out data of the engine rotational speed N from the RAM 56. At point 81, the CPU 44 reads out data of the intake pressure P from RAM 56. At next point 82, a value of air-fuel ratio $\lambda_1$, which corresponds to a combination of the engine rotational speed N sensed at point 80 and the intake pressure P sensed at point 81, is calculated using the map (FIG. 3) stored in the ROM 54. Next, at point 83, CPU 44 calculates, using a curve $l_1$ in FIG. 5 stored in the ROM 54, a value of ignition timing $\theta_1'$ which corresponds to the air-fuel ratio calculated at point 82. The apostrophe means that this data is data to be calculated from the curve of FIG. 5. At point 84, the CPU 44 takes the data of the actual air-fuel ratio from the air-fuel ratio sensor 36. At step 85, the ignition timing $\theta_2'$ corresponding to the sensed air-fuel ratio $\lambda_2$ is calculated from line $l_1$ in FIG. 5 stored in the ROM 54. Then, at point 86, a difference $\Delta\theta$ between the ignition timing at the target air-fuel ratio $\theta_2'$ and the ignition timing at the actual air-fuel ratio $\theta_1'$ is determined. The difference $\Delta\theta$ is stored in the predetermined area of the RAM 56.

Figure 7:
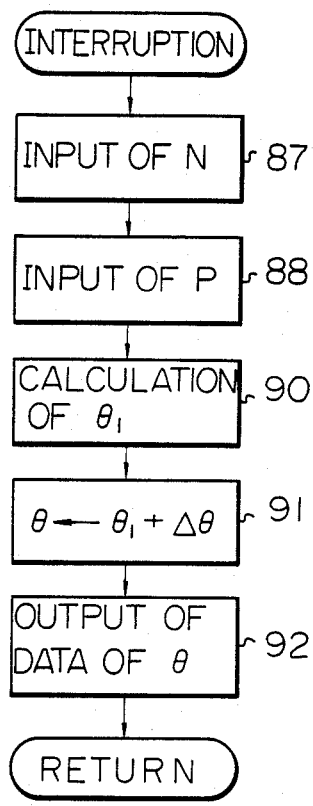

FIG. 7 indicates an interruption routine for calculating the ignition timing effected at every predetermined crank angle. At point 87, data indicating the engine rotational speed N is taken. At point 88, data indicating the intake air pressure P is taken. At point 90, ignition timing $\theta_1$, which corresponds to a combination of the sensed N and P, is calculated using the map of FIG. 4 stored in the ROM 54. At point 91, ignition timing $\theta$ is calculated, which is the sum of the ignition timing $\theta_1$ and the correction value $\Delta\theta$ obtained by effecting the routine of FIG. 6 and stored in RAM 56. At point 92, an ignition timing signal is issued to the output port 50 to cause the drive circuit 52 to operate the spark plug 18 and effect ignition at a crank angle corresponding to the target ignition timing $\theta$. Such control of the ignition timing when the air-fuel ratio is off from the target value allows the engine to quickly catch up with changes in the air-fuel ratio. Thus, increased fuel consumption efficiency as well as small emission are realized.

Many modifications and changes may be made by those skilled in the art without departing from the scope of the present invention.

We claim:

1. An engine operating apparatus for an internal combustion engine supplied with a lean air-fuel mixture, said apparatus comprising:
    a first lean sensor means in contact with exhaust gas from the engine for directly detecting an actual air-fuel ratio of the engine so as to obtain continuously varying signals indicating the detected air-fuel ratio;
    a second sensor means for detecting at least one engine operating parameter, so as to obtain signals indicating the detected engine operating parameters;
    a first calculating means for calculating the air-fuel ratio by using the signals from the operating parameter detecting means;
    a second calculating means for calculating a basic ignition timing using signals from the operating parameter detecting means;
    a third calculating means for calculating a difference between the air-fuel ratio calculated by the first calculating means and the air-fuel ratio actually and directly detected by the air-fuel ratio detecting means;
    a fourth calculating means for calculating a correction value of ignition timing corresponding to the difference; and
    a means for generating ignition of the engine at an ignition timing which is the sum of the basic ignition timing and the correction value.

2. An apparatus according to claim 1, wherein said third calculating means comprises:
    a means for storing data of ignition timing with respect to various air-fuel ratios and
    a means for calculating, at the detected operating conditions of the engine, a difference of the air-fuel ratio as calculated by the first calculating means from the air-fuel ratio as detected by the second sensor means.

3. An apparatus according to claim 2, wherein said storing means comprising a means for storing a single relationship between the air-fuel ratio and the ignition timing which is common to all engine operating conditions.

4. An apparatus according to claim 1, wherein said first sensor means comprises a so-called lean sensor for detecting an air-fuel ratio larger than a theoretical air-fuel ratio.

5. An apparatus according to claim 1, wherein said second sensor means comprises a first sensor for detection of an engine rotational speed and a second sensor for detection of an intake air pressure.

6. In an operating apparatus of an internal combustion engine supplied with a lean air-fuel mixture, said engine being provided with means for controlling the amount of fuel supplied to the engine in response to a present air-fuel ratio determined at each operating condition of the engine, the improvement wherein said engine is not provided with means responsive to said present air-fuel ratio for effecting a feedback control of the amount of fuel to be supplied to the engine, and wherein said engine is provided with a system for controlling the ignition timing, said ignition timing control system comprising:
    a first lean sensor means for directly detecting an actual air-fuel ratio of the engine so as to obtain continuously varying signals indicating the present air-fuel ratio;
    a second sensor means for detecting at least one engine operating parameter so as to obtain signals indicating the detected engine operating parameters;
    a first calculating means for calculating the theoretical air-fuel ratio by using the signals from the operating parameter detecting means;
    a second calculating means for calculating a basic ignition timing using signals from the operating parameter detecting means;
    a third calculating means for calculating a difference between the theoretical air-fuel ratio calculated by the first calculating means and the present air-fuel ratio actually and directly detected by the air-fuel ratio detecting means;
    a fourth calculating means for calculating a correction value of ignition timing corresponding to the difference; and
    a means for generating ignition of the engine at an ignition timing which is the sum of the basic ignition timing and the correction value.

* * * * *